(12) United States Patent
Shi et al.

(10) Patent No.: US 7,656,804 B2
(45) Date of Patent: Feb. 2, 2010

(54) METHOD AND APPARATUS FOR OPERATING AN AD-HOC COMMUNICATION SYSTEM

(75) Inventors: Qicai Shi, Coral Springs, FL (US); Jian Huang, Coral Springs, FL (US); Yan Huang, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 877 days.

(21) Appl. No.: 10/919,139

(22) Filed: Aug. 16, 2004

(65) Prior Publication Data

US 2006/0034193 A1   Feb. 16, 2006

(51) Int. Cl.
*H04L 12/28* (2006.01)
(52) U.S. Cl. .................. 370/238; 370/255; 370/312; 370/351; 370/400
(58) Field of Classification Search .......... 370/254, 370/255, 351, 395.31, 400, 238, 312
See application file for complete search history.

(56) References Cited

U.S. PATENT DOCUMENTS

| | | | |
|---|---|---|---|
| 5,606,669 A | 2/1997 | Bertin | |
| 5,734,687 A * | 3/1998 | Kainulainen | 375/357 |
| 5,777,989 A * | 7/1998 | McGarvey | 370/254 |
| 5,926,101 A | 7/1999 | Dasgupt | |
| 6,041,358 A * | 3/2000 | Huang et al. | 709/238 |
| 6,046,978 A * | 4/2000 | Melnik | 370/221 |
| 6,262,996 B1 | 7/2001 | Kainulainen et al. | 370/503 |
| 6,304,556 B1 * | 10/2001 | Haas | 370/254 |
| 6,324,577 B1 * | 11/2001 | Hirai | 709/223 |
| 6,449,667 B1 * | 9/2002 | Ganmukhi et al. | 710/28 |
| 6,744,740 B2 | 6/2004 | Chen | |
| 6,760,588 B2 * | 7/2004 | Okajima et al. | 455/437 |
| 6,775,258 B1 * | 8/2004 | van Valkenburg et al. | 370/338 |
| 6,788,650 B2 * | 9/2004 | Chen et al. | 370/254 |
| 6,816,460 B1 * | 11/2004 | Ahmed et al. | 370/238 |
| 6,845,091 B2 * | 1/2005 | Ogier et al. | 370/338 |
| 6,954,749 B2 * | 10/2005 | Greenblatt et al. | 707/4 |
| 6,982,960 B2 * | 1/2006 | Lee et al. | 370/254 |
| 7,002,938 B2 * | 2/2006 | Hester et al. | 370/330 |
| 7,002,944 B2 * | 2/2006 | Kats et al. | 370/338 |
| 7,002,959 B2 * | 2/2006 | Suzuki et al. | 370/393 |
| 7,042,863 B1 * | 5/2006 | Morris | 370/338 |
| 7,107,498 B1 * | 9/2006 | Schmidt et al. | 714/704 |
| 7,177,646 B2 * | 2/2007 | O'Neill et al. | 455/450 |
| 7,203,175 B2 * | 4/2007 | Thubert et al. | 370/254 |
| 7,243,160 B2 * | 7/2007 | Brahmaroutu | 709/238 |
| 7,281,057 B2 * | 10/2007 | Cain | 709/238 |
| 7,295,521 B2 * | 11/2007 | Choi et al. | 370/238 |
| 7,298,743 B2 * | 11/2007 | Markki et al. | 370/392 |

(Continued)

OTHER PUBLICATIONS

Hester, "A Self-Organizing Wireless Network Protocol", Jun. 2001, Northwestern Univeristy Dissertation, selected pages.*

(Continued)

*Primary Examiner*—Dang T Ton
*Assistant Examiner*—Brian T. O'Connor

(57) ABSTRACT

An ad-hoc communication system is established where each node within the system may have multiple children nodes and parent nodes. An address scheme is proposed where each node may comprise more than one address, each address being based upon one of the parent's address. Because each node may have more than one parent, a bridge, or shortcut may exist between network branches.

13 Claims, 5 Drawing Sheets

U.S. PATENT DOCUMENTS

| | | | | |
|---|---|---|---|---|
| 7,299,038 | B2 * | 11/2007 | Kennedy et al. | 455/422.1 |
| 7,333,461 | B2 * | 2/2008 | Thubert et al. | 370/338 |
| 7,343,378 | B2 * | 3/2008 | Marcjan | 707/101 |
| 7,366,113 | B1 * | 4/2008 | Chandra et al. | 370/255 |
| 7,515,552 | B2 * | 4/2009 | Bhatti | 370/254 |
| 7,535,855 | B2 * | 5/2009 | Bhatti et al. | 370/254 |
| 2004/0003111 | A1 | 1/2004 | Maeda et al. | |
| 2005/0180447 | A1 * | 8/2005 | Lim et al. | 370/432 |
| 2005/0265259 | A1 * | 12/2005 | Thubert et al. | 370/255 |
| 2005/0281207 | A1 * | 12/2005 | Lee et al. | 370/256 |
| 2006/0245360 | A1 * | 11/2006 | Ensor et al. | 370/238 |

OTHER PUBLICATIONS

Hinden et al., "Internet Protocol Version 6 (IPv6) Addressing Architecture", Apr. 2003, IETF, RFC3513.*

Mohsin et al., "IP Address Assignment in a Mobile Ad Hoc Network", Oct. 2002, IEEE, MILCOM 2002, p. 856-861.*

Weniger, "Passive Duplicate Address Detection in Mobile Ad Hoc Networks", Mar. 2003, IEEE WCNC 2003, p. 1504-1509.*

Gutierrez et al, "IEEE 802.15.4: A Developing Standard for Low-Power Low-Cost Wireless Personal Area Networks", Sep. 2001, IEEE Network, pp. 12-19.*

Pham Chi, "PCT International Search Report and Written Opinion," WIPO, ISA/US, Commissioner for Patents, Alexandria, VA, USA, Mar. 1, 2006.

Beate Giffo-Schmitt, "PCT International Preliminary Report on Patentability," The International Bureau of WIPO, Geneva, Switzerland Mar. 1, 2007.

* cited by examiner

100

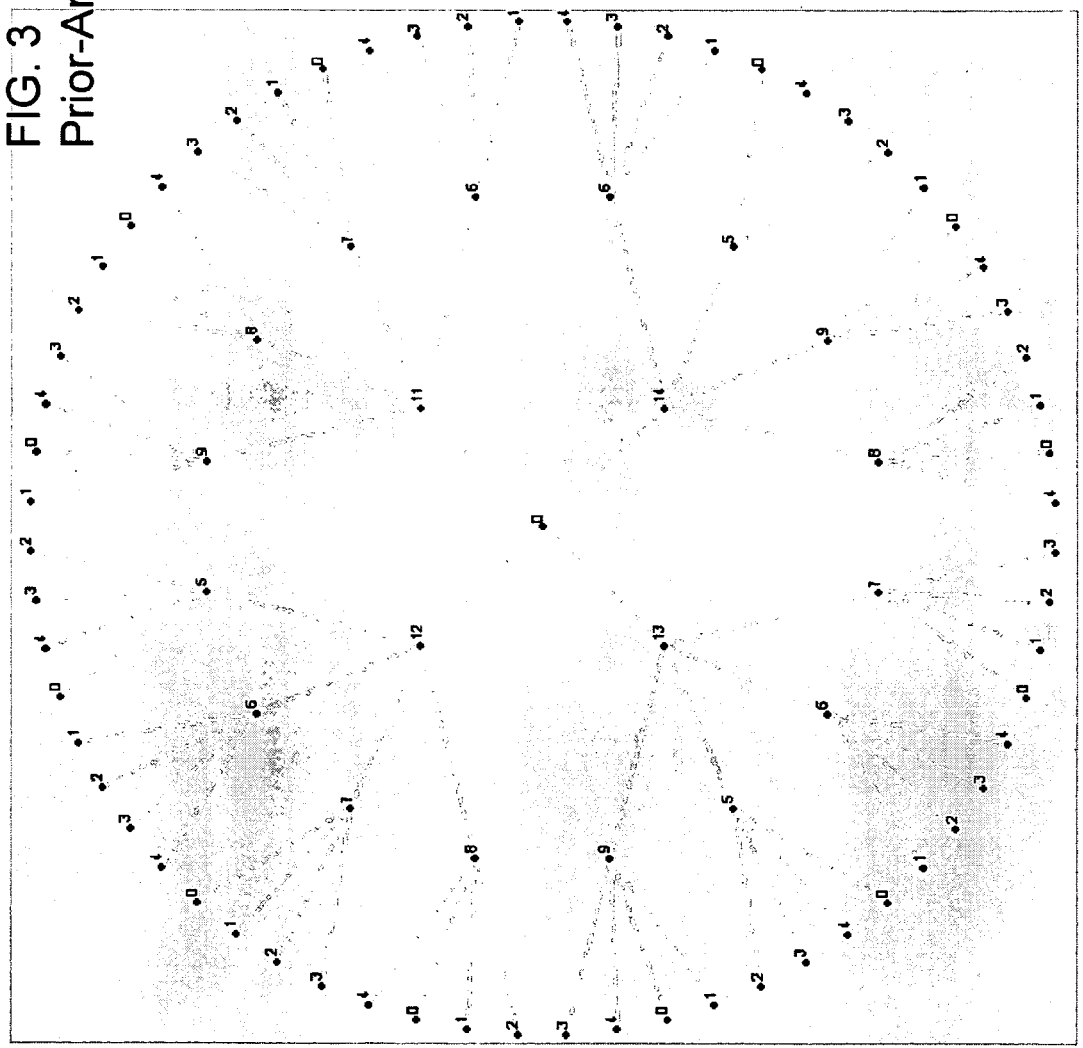

METHOD AND APPARATUS FOR OPERATING AN AD-HOC COMMUNICATION SYSTEM

FIELD OF THE INVENTION

The present invention relates generally to communication systems and in particular, to a method and apparatus for operating an ad-hoc communication system.

BACKGROUND OF THE INVENTION

Wireless ad hoc communication systems allow a number of devices (nodes) to communicate with each other without a need to pass communications through any particular node, or infrastructure. Data communication between devices occurs by firstly discovering intervening nodes that exist between a source and a destination node, and then relaying the data from the source node, through the intervening nodes, to the destination node. As is evident, many routes may exist between the source and the destination node, and the discovery of the most optimal route may be difficult for any network to achieve.

Obviously, for any ad-hoc communication system to function properly, a method and apparatus for operating the ad-hoc communication system must exist that discovers efficient routes between source and destination nodes. Therefore a need exists for a method and apparatus for operating an ad-hoc communication system that lends itself to easy route discovery, while assuring that any route discovered is an efficient route between devices.

BRIEF DESCRIPTION OF THE DRAWINGS

FIG. 3 illustrates a prior-art network.

DETAILED DESCRIPTION OF THE DRAWINGS

To address the above-mentioned need method and apparatus for operating an ad-hoc communication system is provided herein. More particularly, an ad-hoc communication system is established where each node within the system may have multiple children nodes and multiple parent nodes. An address scheme is proposed where each node may comprise more than one address, each address being based upon one of the parent's address. Because each node may have more than one parent, a bridge, or shortcut may exist between network branches. This is in contrast to prior-art techniques for routing in which a single node may have only a single parent.

The present invention encompasses a method for operating a node within an ad-hoc communication system. The method comprising the steps of associating with a first parent node, receiving a first address from the first parent node, associating with a second parent node, and receiving a second address from the second parent node.

The present invention additionally encompasses a method for finding a best route to a destination node. The method comprises the steps of determining a number of hops to the destination node through a first parent node, determining a number of hops to the destination node through a second parent node, determining a number of hops to the destination node through a first child node, and determining a number of hops to the destination node through a second child node. A node having a shortest number of hops to the destination node is determined and route information is provided for routing data through the node having the shortest number of hops.

The present invention additionally encompasses a node existing within an ad-hoc communication system. The node comprises logic circuitry associating the node with a first and a second parent node and a receiver, receiving a first address from the first parent node and receiving a second address from the second parent node.

The present invention additionally encompasses an apparatus for determining a best route to a destination node. The apparatus comprising logic circuitry for determining a number of hops to the destination node through a first parent node, determining a number of hops to the destination node through a second parent node, determining a number of hops to the destination node through a first child node, determining a number of hops to the destination node through a second child node, and determining a node having a shortest number of hops to the destination node. The apparatus additionally encompasses a transmitter for providing route information in order to route data through the node having the shortest number of hops.

Figure 1:
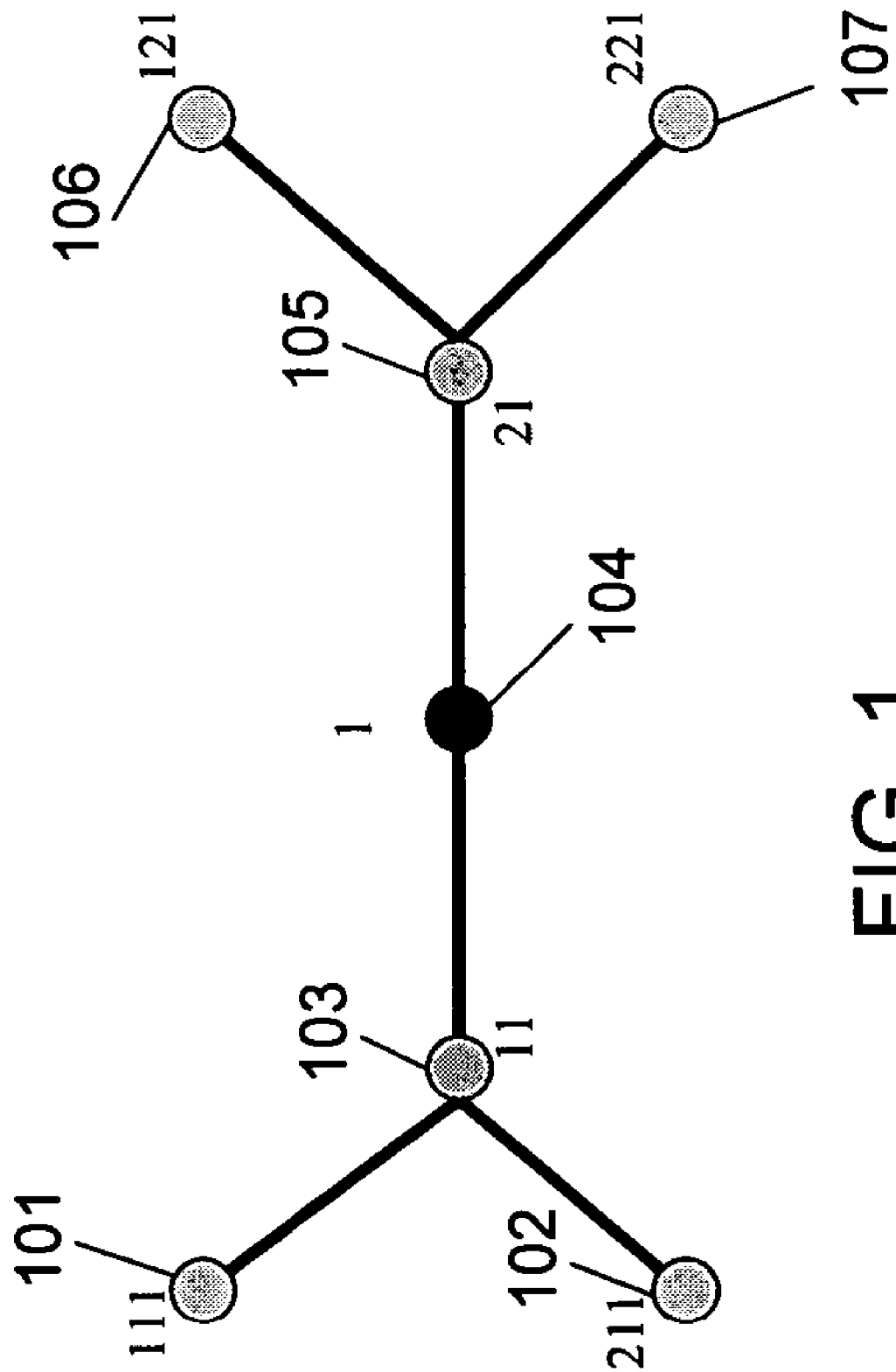
FIG. 1 is a block diagram of a prior-art ad-hoc hierarchy tree network.

Turning now to the drawings, wherein like numerals designate like components, FIG. 1 is a block diagram of network 100. As is evident, network 100 comprises a plurality of network nodes 101-107 in communication with each other. Network 100 preferably utilizes a modified neuRFon™ system protocol as described in U.S. patent application Ser. No. 09/803,259. As one of ordinary skill in the art will recognize, within the neuRFon™ system protocol single root node 104 serves as a group leader (GL), other nodes 103, 105 (referred to as "children nodes") form a direct link to group leader 104, with up to a maximum number ($C_m$) of children nodes under any given node. In a similar manner, each child node 101-103 and 105-107 can serve as its own group leader and have up to $C_m$ child nodes themselves. Thus, in FIG. 1, where $C_m=2$, group leader 104 has two child nodes 103 and 105. In a similar manner, child nodes 103 and 105 serve as their own group leader and each have two child nodes in direct communication with them. Particularly, child node 103 has nodes 101 and 102 in direct communication with it, while child node 105 has nodes 106 and 107 in direct communication with it.

Each node 101-107 within communication system 100 is assigned an address that indicates how many hops in communication the node is from root node 104. More generally, every node (except the root node) is assigned a "first" and a "last" (second) name, with the "last" name being equal to a parent's whole name (i.e., the parents first and last name). Thus, for example, root node 104 is at level 1 and assigned a whole name of "1". Nodes 103 and 105, being the first two nodes under node 104 are assigned a first name of "1" and "2" respectively, with each having a last name of 1. Thus, node 103 is named "11" with node 105 being named "21". In a similar manner, with nodes 101 and 102 being the first and the second nodes under node 103, node 101 is given a first name of "1" and node 102 is given a first name of "2". Each node has a last name of "11" (the parent node's whole name). Thus, node 101 is named "111" while node 102 is named "211".

Extrapolating this nomenclature to a system where $C_m=4$ and a group leader's whole name is "31", then:

If there is only one group member, then the name of it is "131".

If there are two group members, then the names of the group members are "131", and "231".

If there are three group members, then the names of the group members are "131", "231" and "331"

If there are four group members, then the names of the group members are "131", "231", "331", and "431".

Figure 2:
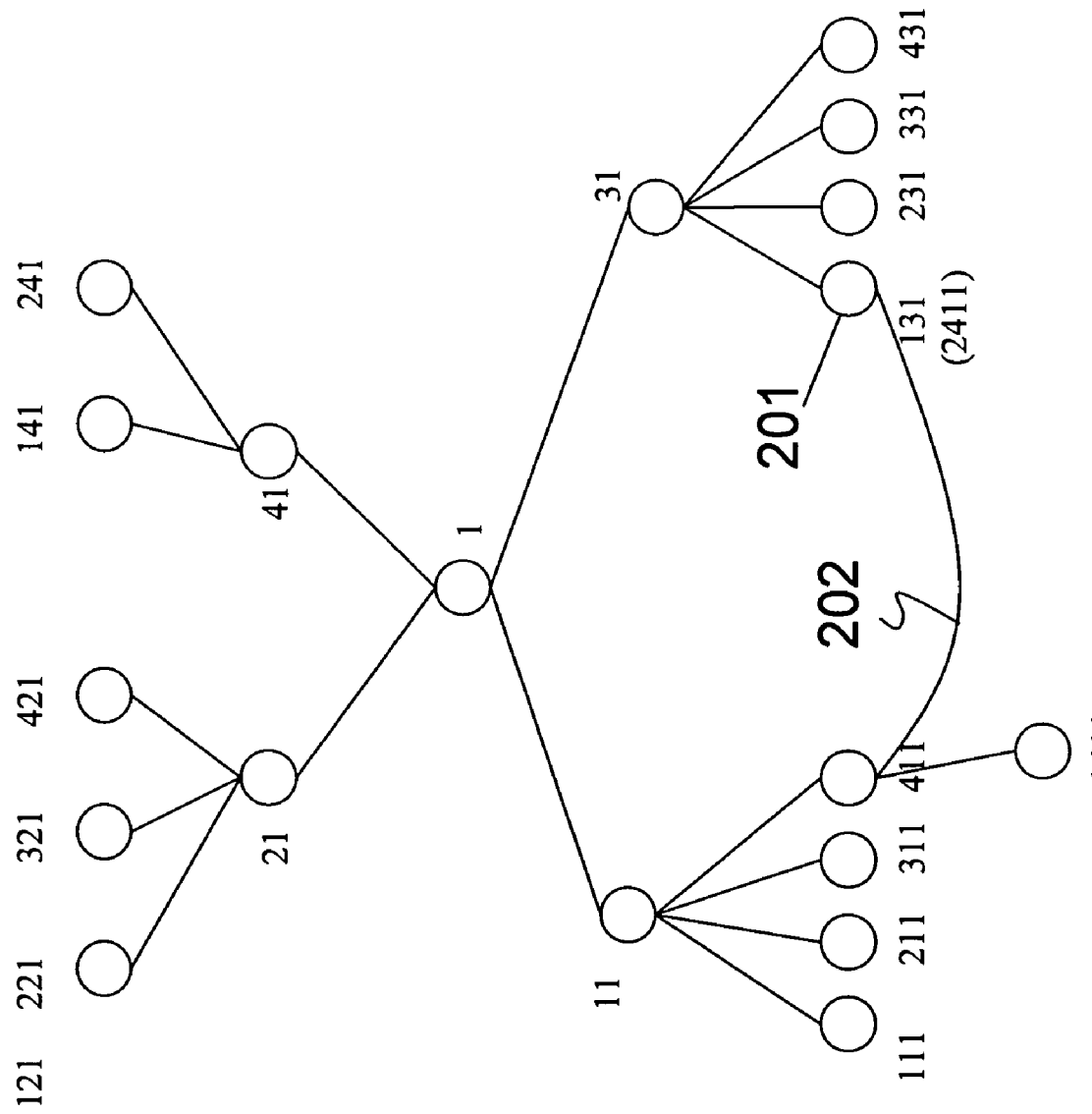
FIG. 2 illustrates network formation having "shortcuts".

Therefore, a particular node within communication system 100 will always obtain an address from its parent node, and will always provide addresses to its child nodes. It should be noted that although FIG. 1 shows each child having a single parent, in the preferred embodiment of the present invention, each child may have up to $C_p$ parents, with $C_p$ preferably being equal to 2. If a device has more than one parent, it will receive one name from each of its parents. Thus it will have more than one name (address). For example, a device having one name "131" that is assigned by GL (parent) "31" may later receive another name "2411" that is assigned by GL (parent) "411". This is illustrated in FIG. 2.

As is evident, node 201 has two parents, namely a first parent with address "31" and a second parent with address "411". Thus, node 201 has two addresses, namely "131" and "2411". Because of this, bridge 202, or shortcut 202 is formed between branch "11" and branch "31". As mentioned, a device can be recruited to join $C_p$ different parents, with $C_p$ preferably being a small number, such as 2, to avoid too many shortcuts. As illustrated in FIG. 3, this is in stark contrast to prior-art techniques for routing in which a single node may have only a single parent. More particularly, FIG. 3 shows a prior-art Parent/Child tree structure for $C_m=4$. As is evident in FIG. 3, each node may have up to $C_m=4$ children, however, only a single parent is allowed, and thus no shortcuts exist between network branches.

Network Formation

During network formation, all the nodes are turned on waiting for a FORMATION message. The FORMATION message typically occurs after all nodes are deployed by manually triggering a specific device to send out the message. Once the FORMATION message has been sent out, the network formation process starts with the specific device acting as an initial group leader or root, sending out the message, and being assigned an address of "1".

As part of the network formation, all the nodes within communication range of the root node (node 1) will receive the FORMATION message. Once a neighbor node receives the FORMATION message, an acknowledgment is sent back to the root node. Based on the following rules, the group leader selects its group members:

The group leader determines a RSSI (Receiving Signal Strength Information) and/or Link-Quality for potential child nodes, and only nodes whose RSSI (Receiving Signal Strength Information) and/or Link-Quality are above a threshold are qualified as group members;

If there are more than $C_m$ nodes whose RSSI is greater than the threshold, then only the $C_m$ nodes with the strongest RSSI are selected as group members. Thus, no more than a predetermined number (i.e., $C_m$) of child nodes can be associated with any node.

Once a device is selected as a group member, a name (or logical address) will be assigned to it by the group leader. From now on, the node qualifies to be a new group leader and it will start to recruit its own children. If a node does not receive a name from the group leader, it will continually listen and wait for FORMATION message until a predefined time-out period.

As discussed, once the node receives a name (address), it then starts to recruit its own members/children forming a spanning-tree. The recruiting process is the similar to the process followed by the root node, but has slightly different rules, namely:

Only nodes whose RSSI is greater than a threshold are qualified as group members;

A node may recruit nodes that have already been recruited by another node, however, in order to avoid too many unnecessary short-cut, the direct relatives of the recruiter are not qualified as group members. As an example, a node's children cannot have the nodes parent as their parent;

A node that has more than $C_p$ parents is not qualified as group member;

In order to avoid too many short-cuts within one group, and to effectively expand the network, a group leader shall not have more than $C_c$ ($1 \leq C_c \leq C_m$) members that have been recruited by other nodes;

If there are more than $C_m$ nodes that satisfy the above rules, then nodes with the highest RSSI are chosen as children.

Network Routing

Routing within network 100 is based on a concept of address prefix matching. Suffix matching is used to pass packets in an ascending order. The distance between two nodes is defined as the number of hops that are needed to navigate from one node to the other node. The distance or number of hops between two nodes can easily be determined as follows: Assume $L_a$ is the length of the name of the node-a, $L_b$ is the length of the name of node-b, L is the length of the shared last name by the two nodes. Then the distance D between node-a and node-b can be written as: $D=(L_a-L)+(L_b-L)$. For example: To calculate the distance between node "321" and node "44221". First, determine $L_a=3$, and $L_b=5$. Then, L=2. Finally, the distance can be calculated as $D=(L_a-L)+(L_b-L)=(3-2)+(5-2)=4$.

For routing between a source node and a destination node, the goal is to find a shortest route for sending the message from the source node to the destination node having a least amount of intervening nodes, i.e., one that minimizes D. The following algorithm accomplishes this task:

Step 1: Begin with the source node and define the source node as the current node.

Step 2: Calculate the distance between the current node and the destination node. If the distance is zero, then stop. Otherwise, go to step 3.

Step 3: Find all the children and parents of the current node and calculate the distances between them and the destination node.

Step 4: Identify a child or parent that if utilized in routing, yields the minimum distance.

Step 5: Add the identified node the routing table. (Note: If there is more than one node with the same minimum distance, then pick the node that has the strongest RSSI).

Step 6: Set the identified node as current node, and go to Step 2.

It should be noted that since we may have more than one address for any node, more than one distance between two nodes may be obtained. For these situations the address is used, that if utilized, has the shortest distance to the destination node.

Network Operation

Figure 4:
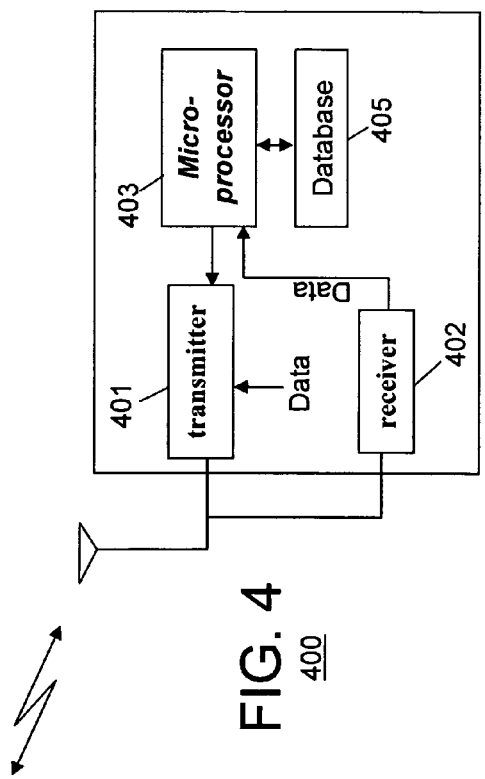
FIG. 4 is a block diagram of a node of FIG. 1.

FIG. 4 is a high-level block diagram of node 400 in accordance with the preferred embodiment of the present invention. In the preferred embodiment of the present invention all nodes within ad-hoc communication system 100 contain the elements shown in node 400. As shown, node 400 comprises transmit circuitry 401, receive circuitry 402, and logic circuitry 403. Logic circuitry 403 preferably comprises a microprocessor controller, such as, but not limited to a Motorola PowerPC microprocessor. In the preferred embodiment of the present invention logic circuitry 403 serves as means for controlling node 400, and as means for analyzing message content to determine any actions needed. Additionally receive and transmit circuitry 401 and 402 are common circuitry known in the art for communication utilizing a well known communication protocol, and serve as means for transmitting and receiving messages. For example, for nodes within communication system 100, receiver 402 and transmitter 401 are well known neuRFon™ transmitters that utilize a modified neuRFon™ communication system protocol. Other possible transmitters and receivers include, but are not limited to transceivers utilizing Bluetooth, IEEE 802.11, or HyperLAN protocols.

Figure 5:
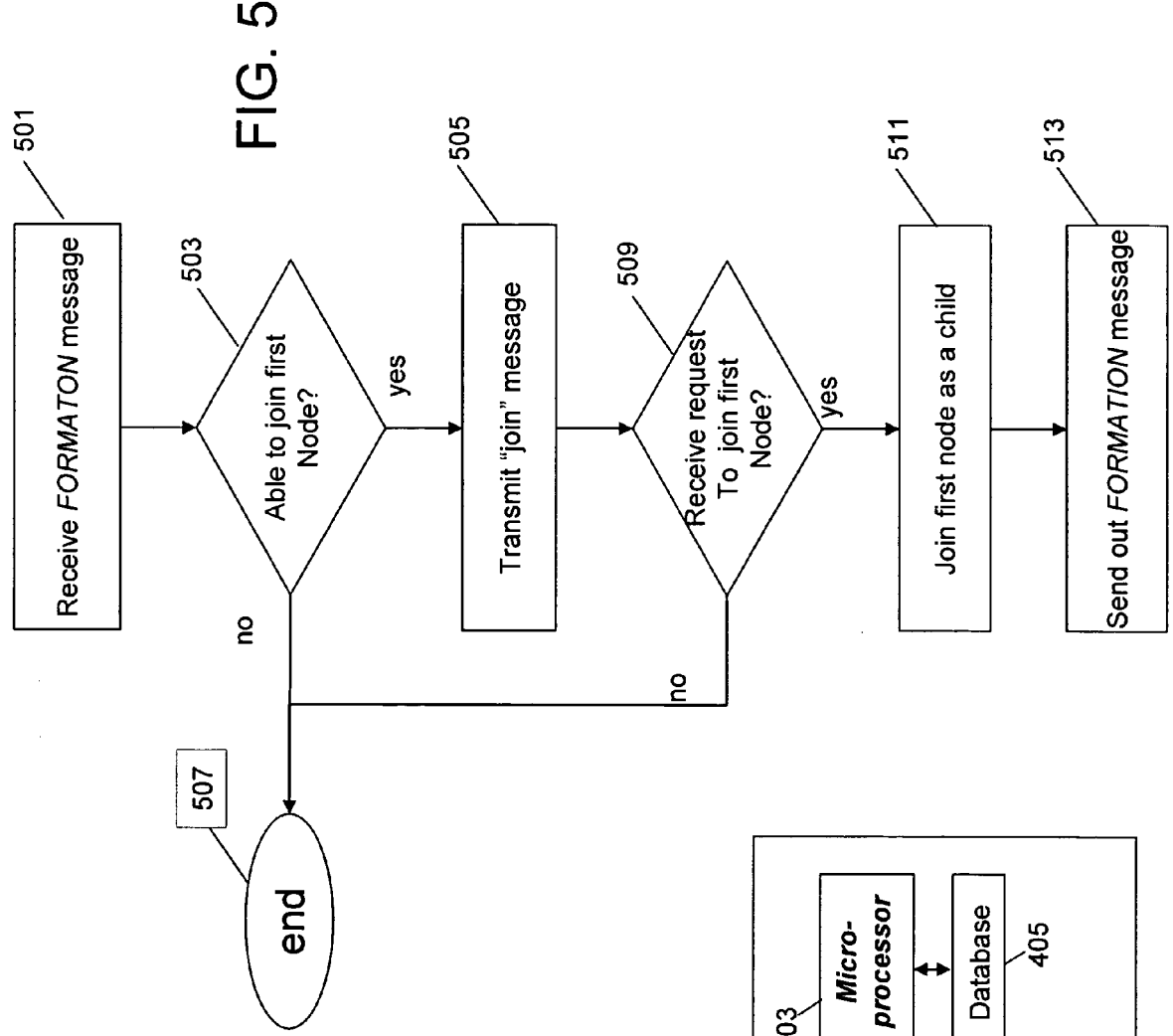
FIG. 5 is a flow chart sowing the operation of a node of FIG. 1 when forming an ad-hoc network.

FIG. 5 is a flow chart showing operation of node 400 when forming an ad-hoc network. The logic flow begins at step 501 where receiver 402 receives a FORMATION message from a first node. At step 503 the FORMATION message is passed to microprocessor 403 where microprocessor 403 determines if it can join the first node, being a child of the first node. As discussed above, any particular node can have no more than a predetermined number (i.e., $C_p$) parents. If, at step 503, it is determined at node 400 can join the first node as a child, the logic flow continues to step 505, otherwise the logic flow ends at step 507.

At step 505 transmitters 401 transmits a "join" message to the first node to join as a child of the first node. The logic flow continues to step 509 where microprocessor 403 determines if a request to join the first node was received. As discussed above, there may be situations where even though a node has asked to join another as its child, the parent node may decline. More particularly, A parent will only accept nodes whose RSSI are greater than a threshold;

A parent may not recruit the siblings (siblings: the nodes share parents), parents;

A parent may not recruit node that already has more than $C_p$ parents;

A parent may not recruit more than $C_c$ nodes that have already been recruited by another node.

A parent may not recruit more than $C_m$ nodes.

If, at step 509 it is determined that a request to join the first node was received, then at step 511 logic circuitry 403 associates the node with the first node as a child, receiving an address from the first node, otherwise the logic flow ends at step 507. At step 513, the child node send out a FORMATION message of its own, and recruits up to $C_m$ child nodes.

It should be noted that the above procedure takes place every time a node hears a formation message. Thus, logic circuitry 403 may instruct node 400 to join up to $C_p$ parents, receiving an address from each parent. Thus, any given node may associate with a first parent, receiving a first address, and then associate with at least a second parent, receiving a second address. As discussed above, a first and a second address portion are received from each parent. Additionally, during the recruiting of the child nodes, differing addresses will be given out to each child. Thus, the node receives a first and a second address from its parents, and may give up to $C_m$ additional addresses to its children, with each address given to its children having a second portion equal to the nodes first or second address.

Figure 6:
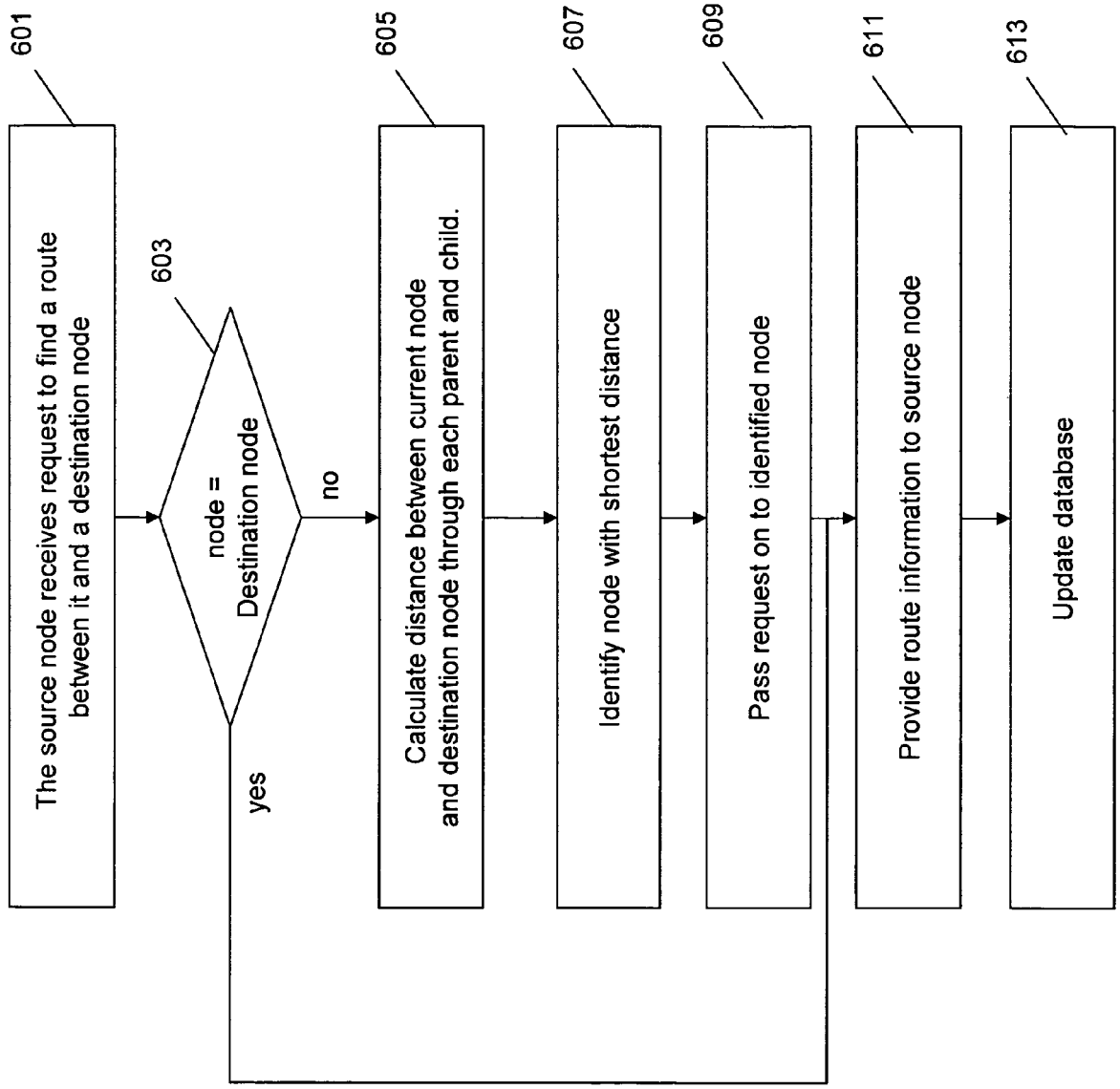
FIG. 6 is a flow chart showing operation of a node of FIG. 1 during route discovery

FIG. 6 is a flow chart showing operation of single node 400 during route discovery. In the following scenario node 400 may be the source, destination, or any intervening node that has been requested to find the best route between a source and a destination node. Additionally, the logic flow in FIG. 6 assumes that the network is established with each node having up to $C_m$ child nodes and $C_p$ parent nodes. The logic flow begins at step 601 where a node 400 receives a request (via receiver 402) to find a best route from a source node to a destination node. This request comprises the source address and the destination address. At step 603 node 400 determines if it is the destination node. If node 400 determines that it is the destination node, then the logic flow continues to step 611, otherwise the logic flow continues to step 605. At step 605 microprocessor 403 determines distances (i.e., number of hops) to the destination node through each parent and child node associated with node 400. In particular, the number of hops to the destination node from each parent and child node associated with node 400 is calculated by utilizing $D=(L_d-L)+(L_{p(c)}-L)$. Where $L_{p(c)}$ is the length of the parent or child name, L is the length of the shared last name by the destination node and the parent/child, and $L_d$ is the length of the destination's name. Since each parent and child has different addresses, and some of them may have more than 1 name, their names will have different length, also the shared last name by the destination and the parent/child may be different.

Continuing, at step 607 a parent or child node having the shortest distance to the destination node is determined and at step 609 the request for route discovery is then passed to the node identified in step 607, and the above procedures take place in the identified node. At step 611 route information is provided back to the source node via transmitter 401 so that it can be updated with route information. In particular, routing information for routing data through the node having the shortest number of hops is provided. At step 613 database 405 is updated with routing information. In particular, database 405 is updated so that node 400 knows where to route data received from the source node, destined to the destination node.

The above procedure allows for a node to discover the shortest number of hops to the destination node by determining a number of hops through each parent and each child. Because multiple parents may exist for each node, a bridge or shortcut may exist for the route, greatly reducing the number of hops needed for relaying the message between the source and destination nodes.

While the invention has been particularly shown and described with reference to a particular embodiment, it will be understood by those skilled in the art that various changes in form and details may be made therein without departing from the spirit and scope of the invention. For example, by carefully choose the transmitting power, one can control the average number of neighbors of the GL, e.g., 10 neighbors. Additionally, each neighbor node may randomly generate an identification ranged from 1 to 255 to distinguish it from other nodes, and each node sends back an ACK at a different time slot. If more than two nodes happened to pick the same number, they are required to repeat the process. It is intended that such changes come within the scope of the following claims.

The invention claimed is:

1. A method for operating a node within an ad-hoc communication system, the method comprising the steps of:

associating the node within the ad-hoc communication system with a first parent node;

receiving by the node within the ad-hoc communication system, a first address from the first parent node a single hop from the node;

associating the node within the ad-hoc communication system, with a second parent node;

receiving by the node within the ad-hoc communication system, a second address from the second parent node a single hop from the node;

wherein the steps of associating with the first and the second parent node results in the node having two parent nodes and two addresses, simultaneously;

wherein the first address comprises a portion comprising a whole address of the first parent node, and the second address comprises a portion comprising a whole address of the second parent node; and wherein the step of associating with the first parent node comprises the step of associating with the first parent node if no more than a predetermined number of parents exist for the node and the step of associating with the second parent node comprises the step of associating with the second parent node if no more than the predetermined number of parents exist for the node.

2. The method of claim 1 wherein the step of receiving the second address from the second parent node comprises the step of receiving a third and a fourth address portion, wherein the fourth address portion is equal to a first and a second address portions assigned to the second parent node.

3. The method of claim 1 further comprising the steps of:
serving as a parent node to a first child node;
assigning the first child node a third address;
serving as a parent node to a second child node; and
assigning the second child node a fourth address.

4. The method of claim 3 wherein the step of assigning the first child node the third address comprises the step of assigning a fifth and a sixth address portion to the first child node, wherein the sixth address portion is equal to the whole first address.

5. The method of claim 4 wherein the step of assigning the second child node the fourth address comprises the step of assigning a seventh and an eighth address portion to the second child node, wherein the eighth address portion is equal to the whole first address.

6. The method of claim 3 wherein the step of serving as the parent to the first child node comprises the steps of:
determining a link quality for the first child node;
determining a current number of child nodes associated with the node; and
serving as the parent node to the first child node when the link quality for the first child node is above a threshold, and when no more than a predetermined number of child nodes are already associated with the node.

7. A method for finding a best route to a destination node, the method comprising the steps of:
determining a number of hops to the destination node through a first parent node;
determining a number of hops to the destination node through a second parent node;
determining a number of hops to the destination node through a first child node;
determining a number of hops to the destination node through a second child node;
determining a node having a shortest number of hops to the destination node; and
providing route information for routing data through the node having the shortest number of hops;
wherein the step of determining the number of hops to the destination node through a parent node comprises the step of determining $D=(L_d-L)+(L_p-L)$, where $L_p$ is a length of the parent's name, L is a length of the shared last name by the destination node and the parent, and $L_d$ is a length of the destination's name.

8. The method of claim 7 wherein the step of determining the number of hops to the destination node through a child node comprises the step of determining $D=(L_d-L)+(L_c-L)$, where $L_c$ is a length of the child's name, L is a length of the shared last name by the destination node and the child, and $L_d$ is a length of the destination's name.

9. A node existing within an ad-hoc communication system, the node comprising:
logic circuitry within a wireless ad-hoc communications device associating the node with a first and a second parent node;
a receiver within the wireless ad-hoc communications device, receiving a first address from the first parent node and receiving a second address from the second parent node, wherein both the first and the second parent nodes are a single hop from the node;
wherein the first address comprises a first and a second address portion, wherein the second address portion is equal to a whole address of the first parent node and the second address comprises a first and a second address portion, wherein the second address portion is equal to a whole address of the second parent node; and
wherein the node has two parent nodes and two addresses, simultaneously;
wherein the logic circuitry associates the node with the first parent node if no more than a predetermined number of parents exist for the node and wherein the logic circuitry associates the node with the second parent node if no more than the predetermined number of parents exist for the node.

10. The node of claim 9 wherein the second address comprises a third and a fourth address portion, wherein the fourth address portion is equal to an address of the second parent node.

11. The node of claim 9 wherein the logic circuitry additionally serves as a parent node to a first child node, and serves as a parent node to a second child node.

12. An apparatus for determining a best route to a destination node, the apparatus comprising:
logic circuitry for determining a number of hops to the destination node through a first parent node, determining a number of hops to the destination node through a second parent node, determining a number of hops to the destination node through a first child node, determining a number of hops to the destination node through a second child node, and determining a node having a shortest number of hops to the destination node; and
a transmitter for providing route information in order to route data through the node having the shortest number of hops;
wherein the number of hops to the destination node through a parent node is calculate by determining $D=(L_d-L)+(L_p-L)$, where $L_p$ is a length of the parent's name, L is a length of the shared last name by the destination node and the parent, and $L_d$ is a length of the destination's name.

13. The apparatus of claim 12 wherein the number of hops to the destination node through a child node comprises the step of determining $D=(L_d-L)+(L_c-L)$, where $L_c$ is a length of the child's name, L is a length of the shared last name by the destination node and the child, and $L_d$ is a length of the destination's name.

* * * * *

UNITED STATES PATENT AND TRADEMARK OFFICE
CERTIFICATE OF CORRECTION

PATENT NO.        : 7,656,804 B2  
APPLICATION NO.   : 10/919139  
DATED             : February 2, 2010  
INVENTOR(S)       : Shi et al.

Page 1 of 1

It is certified that error appears in the above-identified patent and that said Letters Patent is hereby corrected as shown below:

On the title page, item (56), under "OTHER PUBLICATIONS", in Column 2, Line 2, delete "Univeristy" and insert -- University --, therefor.

In Fig. 5, Sheet 4 of 5, for Tag "501", in Line 1, delete "FORMATON" and insert -- FORMATION --, therefor.

In Column 1, Line 42, delete "discovery" and insert -- discovery. --, therefor.

In Column 3, Line 2, delete ""331"" and insert -- "331". --, therefor.

In Column 5, Line 42, delete "node." and insert -- node; --, therefor.

Signed and Sealed this  
First Day of January, 2013

David J. Kappos  
*Director of the United States Patent and Trademark Office*